(12) United States Patent
Akasaka

(10) Patent No.: US 6,240,227 B1
(45) Date of Patent: May 29, 2001

(54) STAR-TYPE OPTICAL COUPLER (75) Inventor: Isao Akasaka, Mie (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/283,296

(22) Filed: Apr. 1, 1999

(30) Foreign Application Priority Data

Apr. 3, 1998 (JP) .................................................. 10-091500

(51) Int. Cl.[7] ...................................................... G02B 6/26
(52) U.S. Cl. .................................. 385/46; 385/24; 385/32
(58) Field of Search .................................... 385/24, 32, 46

(56) References Cited

U.S. PATENT DOCUMENTS 5,127,067 * 6/1992 Delcoco et al. ......................... 385/24
5,146,520   9/1992 Yuuki et al. .
5,675,679  10/1997 Yuuki .
5,933,555 * 8/1999 Shen ....................................... 385/32

* cited by examiner

Primary Examiner—Hung N. Ngo
(74) Attorney, Agent, or Firm—Greenblum & Bernstein, P.L.C.

(57) ABSTRACT

Optical fibers used in a star-type optical coupler each have a light signal input terminal and a light signal output terminal. A light signal passes through the optical fibers in a linear displacement. According to the present invention, linear displacement of the light is transformed into a generally circular movement through a coupling ring, such that the input terminals of the optical fibers need not be grouped on the same side of the optical fibers, and likewise for the output terminals of the optical fibers. Thus, the input terminal of a first optical fiber and the output terminal of a second optical fiber can be arranged adjacent to each other, so as to form a pair. When the input terminal is thus paired with the output terminal, the star-type optical coupler can be connected to peripheral optical communications apparatuses more easily.

4 Claims, 6 Drawing Sheets

STAR-TYPE OPTICAL COUPLER

BACKGROUND OF THE INVENTION

1. Field of the Invention

The present invention relates to coupling means for branching optical fibers used in optical communications systems. More particularly, the invention concerns a coupling ring for branching such optical fibers in a star-type optical coupler.

2. Description of the Prior Art

Known star-type couplers are manufactured as follows: a plurality of optical fibers are drawn from quartz or an industrial plastic. The optical fibers are then branched by binding technologies such as heat melting or ultrasonic welding.

Figure 1:
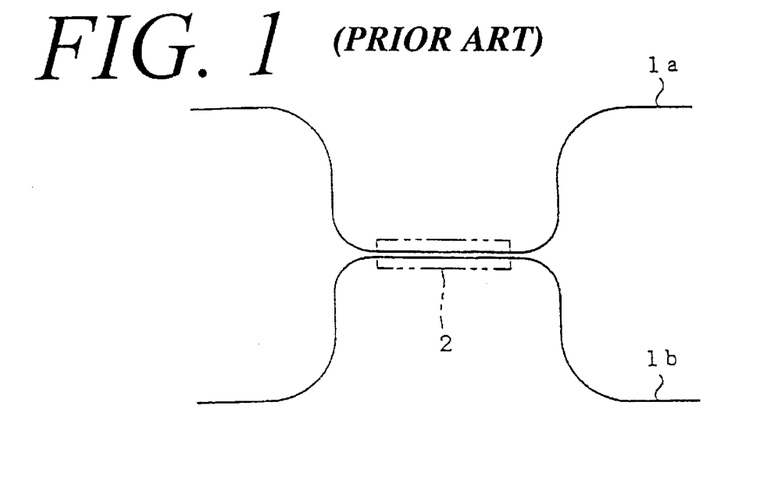
FIG. 1 shows a prior art star-type optical coupler in which a pair of optical fibers is branched at a single branching point.

FIG. 1 illustrates a known branching method, according to which a pair of optical fibers 1a and 1b is bound at one branching point 2. A number of optical fibers can be bound through this pair-coupling method. However, branching becomes complicated as the number of branchings increases.

Figure 2:
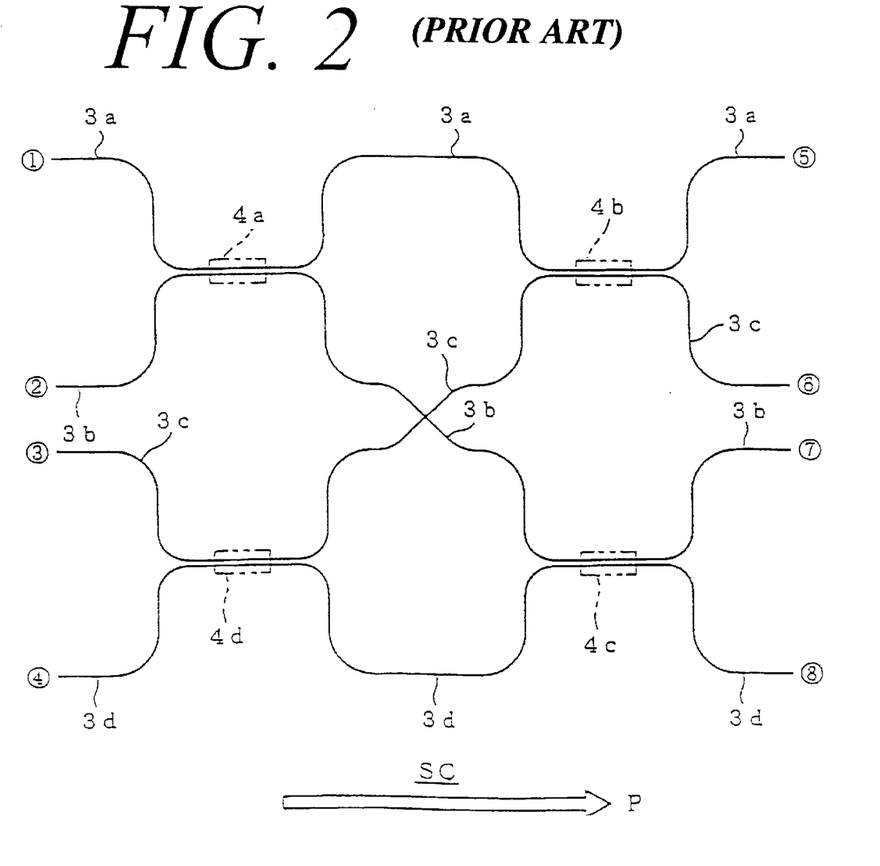
FIG. 2 shows a prior art star-type optical coupler including a quadruple branching point.

FIG. 2 shows a coupling map inside a star-type optical coupler SC which includes four branching points. In this map, a first light input terminal 1 is connected to a first optical fiber 3a, where it becomes branched with a second optical fiber 3b at a first branching point 4a. The first optical fiber 3a is further branched with a third optical fiber 3c at a second branching point 4b. The second optical fiber 3b that is thus coupled with the first optical fiber 3a at the first branching point 4a, is also coupled with a fourth optical fiber 3d at a third branching point 4c. Thus, a light signal entering the first optical fiber 3a from the light input terminal 1 exits from a light signal output terminal 5 of the first optical fiber 3a. At the same time, the same light signal passes through the third optical fiber 3c branched with the first optical fiber 3a at the second branching point 4b. It also passes through the second optical fiber 3b branched with the first optical fiber 3a at the first branching point 4a, and through the fourth optical fiber 3d branched with this second optical fiber 3b at the third branching point 4c. Thus, the light signal is branched into four light output terminals 5–8. Further, the third optical fiber 3c and the fourth optical fiber 3d are branched at the fourth branching point 4d, so that all the four optical fibers 3a to 3d are mutually branched. In the same manner, the light signals entering the other light input terminals 2 to 4 are all branched through the branching points 4a to 4d and exit at light output terminals 5 to 8.

The above system concerns a system having four branching points (quadruple branching system). However, even when only triple branching is desired, it is common practice to employ the quadruple branching system using four optical fibers 3a to 3d based on the above-mentioned principle. One reason for this is that, by setting the same number of branchings for all the optical fibers 3a to 3d, the light intensity at their light output terminals can be maintained at the same level. Another reason is that standardization of the product specifications for star-type optical couplers SC is thus simpler.

For example, in the system shown in FIG. 2, it may happen that only optical fibers 3a to 3c need to be branched, and not the fourth optical fiber 3d. Even in such a case, all the optical fibers 3a to 3d are branched, but light input terminal 4 and light output terminal 8 are left unconnected to external apparatuses.

In this case, the first optical fiber 3a, the second optical fiber 3b, the third optical fiber 3c and the fourth optical fiber 3d each have two branching points, which are respectively: 4a and 4b, 4a and 4c, 4d and 4b, and 4d and 4c. Each of the optical fibers 3a to 3d thus has two branching points, so that the light intensities at the output terminals are kept even. Consequently, the signal quality in optical communications can be maintained constant.

The above-mentioned double branching of each of the optical fibers 3a to 3d may also be called "two-step branching", and the number of steps may be designated as "m" (where m is an integer). Accordingly, the condition for obtaining a constant light-output quality is that the number of optical fibers to be used can be expressed as $2^m$, i.e. 2, 4, 8, or 16 fibers, etc.

In the star-type optical coupler SC shown in FIG. 2, light is branched by virtue of a light advancement vector found in optical fibers 3a to 3d. Therefore, the coupler directs unidirectional light signals as indicated by the arrow "P", so that a plurality of light input terminals 1 to 4 are disposed on one side, while corresponding light output terminals 5 to 8 are disposed on the other side. However, this configuration may create some problems in practical use.

Figure 3:
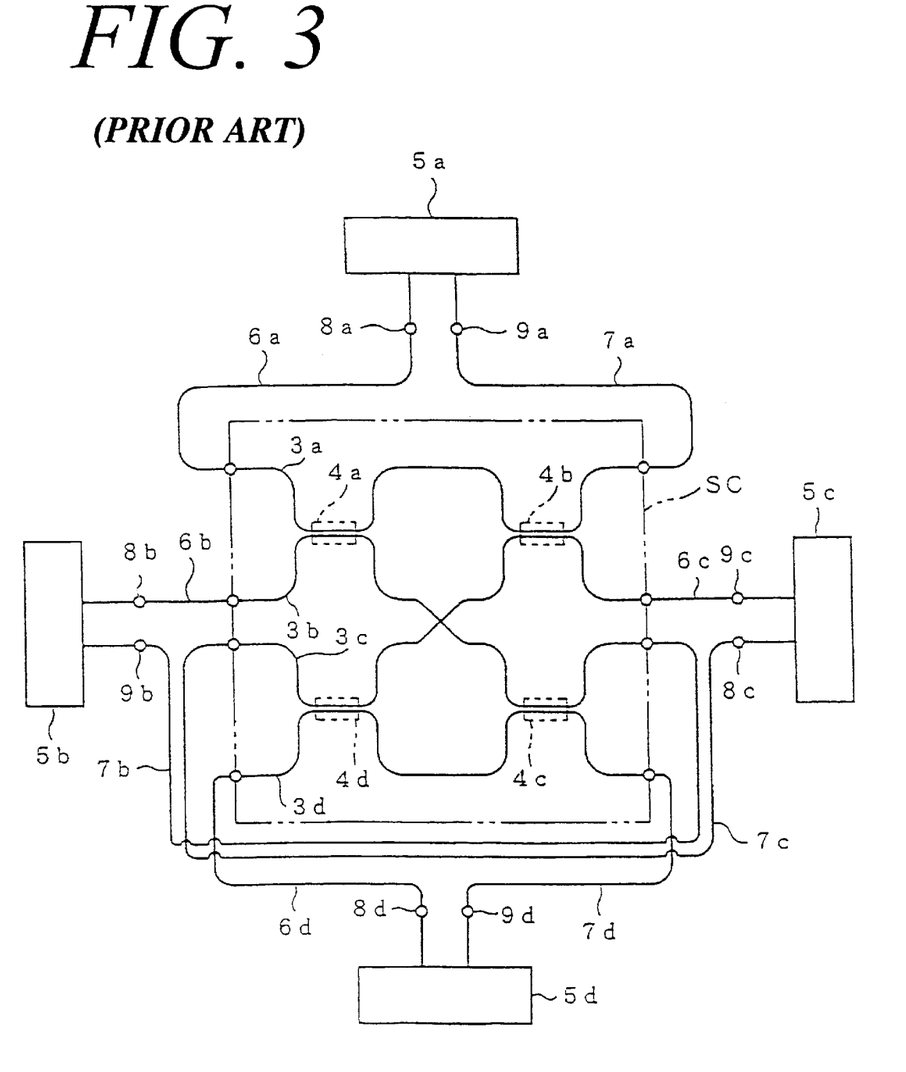
FIG. 3 shows the wiring of cables inside a prior art star-type optical coupler, when it is connected to four optical communications apparatuses.

FIG. 3 shows a prior art coupling system, in which the star-type optical coupler SC of FIG. 2 is connected to four light communication apparatuses 5a to 5d. In this case, the coupler is connected to the light communication apparatuses through its light input terminals 8a to 8d and its light output terminals 9a to 9d. As can be seen in FIG. 3, optical fiber cables 6a to 6d and 7a to 7d, respectively wired for light input terminals 8a to 8d and light output terminals 9a to 9d, become entangled at the periphery of the star-type optical coupler SC.

The optical fiber cables 6a to 6d and 7a to 7d are set to have a radius of curvature exceeding the minimum flexing radius, i.e. about 5 to 10 mm, above which the flexing of a cable does not increase optical loss. The cable must thus avoid being flexed into a radius smaller than these figures. Accordingly, the optical fiber cables 6a to 6d and 7a to 7d in the vicinity of the star-type optical coupler SC may become intertwined. It may even not be possible to contain them in a housing, which gives rise to aesthetic problems.

Further, the prior art star-type optical coupler SC includes branching points 4a to 4d in accordance with a multi-step structure. As the number of branching steps "m" becomes greater, the number of optical fibers 3a to 3d used inside the star-type optical coupler leaps exponentially. This in turn increases the number of parts necessary and thus increases material costs.

SUMMARY OF THE INVENTION

Accordingly, an object of the present invention is to provide a star-type optical coupler which simplifies the wiring of the peripheral optical fiber cables.

Another object of the invention is to reduce to a minimum the number of optical fibers used within a star-type optical fiber, as well as the number of parts used.

To this end, there is provided a star-type optical coupler that includes a plurality of optical fibers adapted for passing a light signal having a substantially linear displacement. The optical fibers include at least a first optical fiber and a second optical fiber located adjacent to each other, and each have a light signal input terminal, a light signal output terminal and an intermediate portion, the intermediate portion including a branching point. The star-type optical coupler also includes a coupling ring having a substantially circular configuration and a corresponding number of branching points. The coupling ring is adapted for transforming the substantially linear displacement of the light signal into a generally circular movement. Thus, the plurality of optical fibers are branched into the coupling ring through the branching points, whereby the coupling ring transforms the linear displacement of the light signal into the generally circular movement, such that the light input terminals can be disposed separately from one another, while the light output terminals can also be disposed separately from one another, and such that the light input terminal of the first optical fiber and the light output terminal of the second optical fiber are arranged adjacent to each other.

Preferably, the coupling ring has a minimum flexing radius defined so as not to cause an increase of optical loss, and the coupling ring is set to have a radius of curvature greater than the minimum flexing radius.

More preferably, the plurality of optical fibers have a minimum flexing radius defined so as not to cause the increase of optical loss, and the plurality of optical fibers are bent at the branching points with a radius of curvature greater than the minimum flexing radius.

BRIEF DESCRIPTION OF THE DRAWINGS

The above and other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 4:
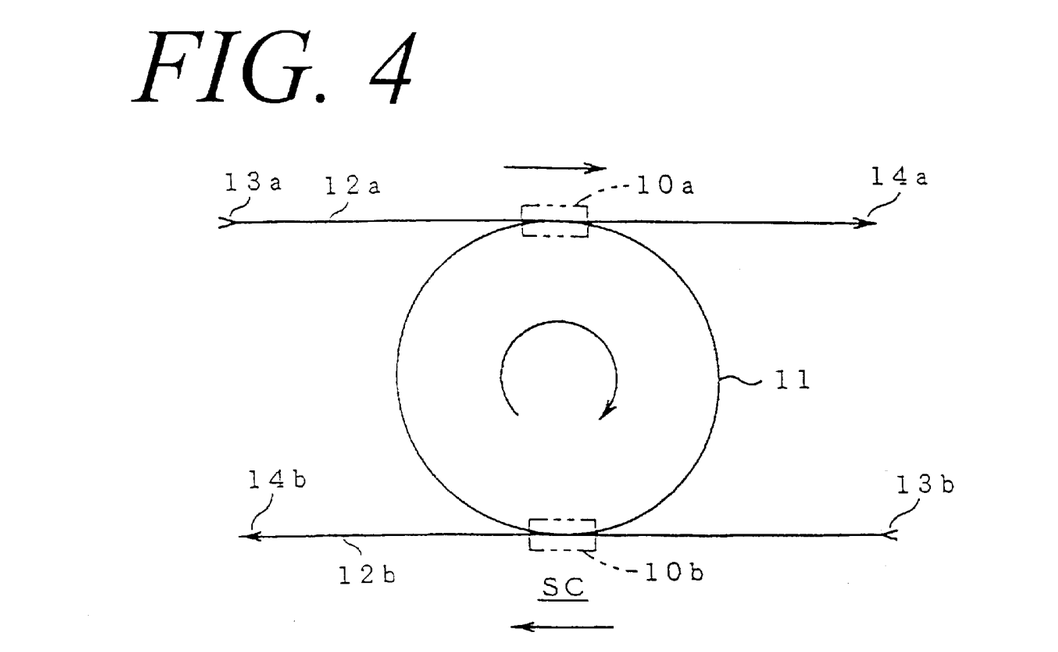
FIG. 4 shows a star-type optical coupler including a coupling ring according to a first embodiment of the invention.
Figure 5:
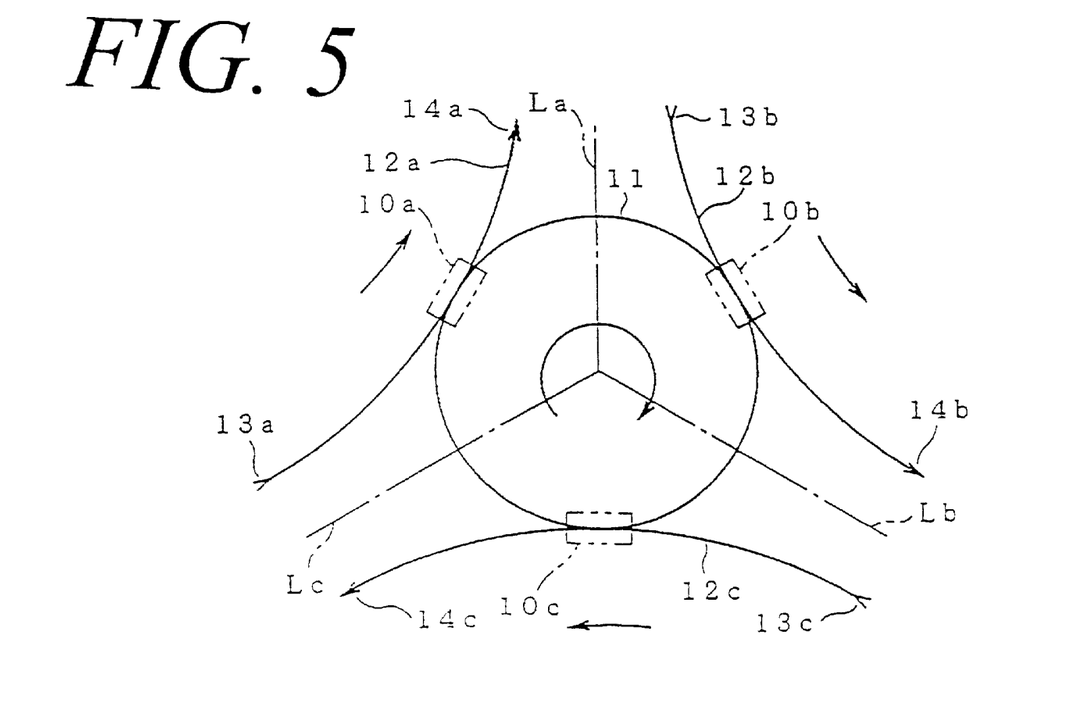
FIG. 5 shows a star-type optical coupler including a coupling ring according to a second embodiment of the invention.
Figure 6:
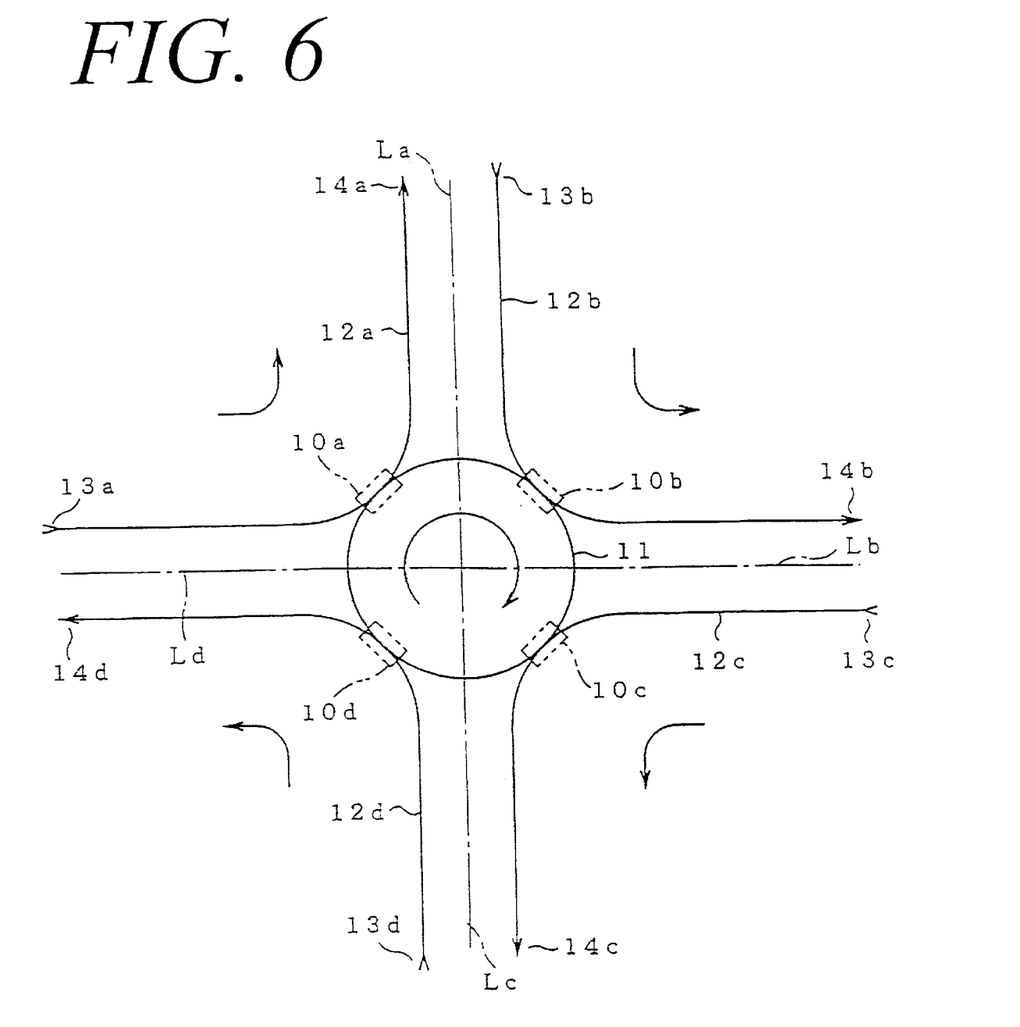
FIG. 6 shows a star-type optical coupler including a coupling ring according to a third embodiment of the invention.

FIGS. 4 to 8 show star-type optical couplers according to the preferred embodiments of the present invention. The star-type optical coupler includes a single coupling ring 11 at its center portion. FIG. 4, FIG. 5 and FIG. 6 respectively show the situations when two, three and four optical fibers are used. All the optical fibers 12a to 12d are branched through the coupling ring 11. This branching is made through the branching points 10a to 10d all centered on one site, instead of making multiple-step branching as in the past. As the optical fibers not connected to external apparatuses are no longer kept, the -number of optical fibers 12a to 12d applied is reduced to the minimum. Moreover, the light displacement direction can be modified to adopt the circumferential direction of the coupling ring 11, so that the coupling members of the light input terminals need no longer be grouped on a same side, and likewise for the coupling members of the light output terminals. Therefore, the wiring of cables connecting to outside optical communications apparatuses (not shown in the figures) can be simplified.

FIG. 4 shows a star-type optical coupler SC according to a first embodiment of the present invention. This coupler SC comprises two optical fibers 12a and 12b arranged in parallel. In this case, a coupling ring 11 is interposed between the optical fibers to form a double branching.

The first optical fiber 12a is branched into the coupling ring 11 through a branching point 10a. When a light signal enters a light signal input terminal 13a located at one end of the first optical fiber 12a, it advances towards a light signal output terminal 14a located at the end of the first optical fiber 12a. At the same time, this light signal is branched into the coupling ring 11 through the first branching point 10a.

The second optical fiber 12b is branched into the coupling ring 11 through the second branching point 10b. When a light signal enters a light signal input terminal 13b located at one end of the second optical fiber 12b, it advances towards a light signal output terminal 14b located at the other end of the second optical fiber 12b. Likewise, the light signal is branched into the coupling ring 11 through the second branching point 10b.

The light signal traveling around the coupling ring 11 penetrates into the optical fiber 12a through the first branching point 10a, and advances towards a light signal output terminal 14a. At the same time, the same light signal penetrates into the second optical fiber 12b through the second branching point 10b, and advances towards a light signal output terminal 14b.

As shown in FIG. 4, a light signal entering the first optical fiber 12a moves from the light input terminal 13a (located at the left side of the figure), towards the light output terminal 14a located at the right side thereof. Likewise, the light signal in the second optical fiber 12b moves from the light input terminal 13b at the right side towards the light output terminal 14b at the left side. Accordingly, the light signal travel directions in the first optical fiber 12a and the second optical fiber 12b are mutually reversed. Furthermore, the light-signal routing is transformed from a linear displacement into a clockwise movement by virtue of the coupling ring 11.

As for the radius of curvature of coupling ring 11, it only needs to satisfy the minimum flexing radius, i.e. a radius of curvature of 5 to 10 mm is generally sufficient for the fibers in this example. The optical fibers 12a and 12b may be bound to the coupling ring 11 through each branching point 10a or 10b by any binding technique, such as heat melting or ultrasonic welding.

If the travel direction of the light signals in the optical fibers 12a and 12b is reversed, the light direction in the coupling ring 11 is also reversed correspondingly.

By transforming the linear movement of light into a generally circular light movement through coupling ring 11, it is possible to establish the light input terminals 13a and 13b of optical fibers 12a and 12b at separate sites. Likewise, the light output terminals 14a and 14b of optical fibers 12a and 12b may be established at separate sites. In addition, optical fibers 12a and 12b are arranged adjacent to each other by only interposing the coupling ring 11 therebetween. Therefore, the light input terminal 13a of a first optical fiber 12a and the light output terminal 14b of a second optical fiber 12b can be assembled at a same site, on the one hand, and the light input terminal 13b of the second optical fiber 12b and the light output terminal 14a of the first optical fiber 12a can be assembled at a same site, on the other. The light input terminal 13a of the first optical fiber 12a, and the light output terminal 14b of the second optical fiber 12b which is arranged nearby, are thus assembled on one side and connected to an optical communications apparatus. Also, the light input terminal 13b of the second optical fiber 12b, and the light output terminal 14a of the first optical fiber 12a which is arranged nearby, are assembled on the other side and connected to another optical communications apparatus. When wiring according to this arrangement, cables need not be deflected in the peripheral zone of the star-type optical coupler SC. Consequently, the wiring for connecting cables to optical communications apparatuses is considerably simplified.

As mentioned above, light is branched into two routes at the branching points 10a and 10b. For example, the light signal entering the optical input terminal 13a of the first optical fiber 12a is branched into two light signal section each having half the original intensity. A first half portion exits from the light output terminal 14a of the first optical fiber 12a, while the other half portion enters the coupling ring 11.

The light which enters the coupling ring 11 is further branched into two light signal sections at the branching point 10b. The light then exits from the light output terminal 14b of the second optical fiber 12b at a quarter of the intensity of the original light signal entering the light input terminal 13a for the first optical fiber 12a. Therefore, the light output level from each of the two light output terminals 14a and 14b is different. However, this kind of problem can be solved by choosing an appropriate optical communications apparatus for connecting to the star-type optical coupler SC. For example, a dynamic-range type apparatus is well adapted for running under such different light level conditions.

As mentioned, the light is branched into two sections at the branching points 10a and 10b. This means that the light suffers a loss of 3 dB (expressed as −3 dB) at each of the branching points 10a and 10b. To simplify calculations, no further optical loss is taken into account for the branching points 10a and 10b in the following description.

When a light signal (0 dBm) enters the light input terminal 13a of the first optical fiber 12a, the light output at the light output terminal 14b of the second optical fiber 12b and at the light output terminal 14a of the first optical fiber 12a is −6 dBm and −3 dBm, respectively. Likewise, when a light signal (0 dBm) enters the light input terminal 13b of the second optical fiber 12b, the light outputs at the light output terminal 14b of the second optical fiber 12b and at the light output terminal 14a of the first optical fiber 12a are −3 dBm and −6 dBm, respectively. Accordingly, between the light output terminal 14a (or 14b) of the optical fiber 12a (or 12b), into which a light signal is inputted, and the light output terminal 14b (or 14a) of the other optical fiber 12b (or 12a), the light output differs by 3 dBm. However, this level of output difference can be corrected in an optical communications apparatus.

FIG. 5 shows a star-type optical coupler SC including triple branching, according to a second embodiment of the present invention. In FIG. 5, the same reference numerals as in FIG. 4 are used for the same functional features. In the star-type optical coupler SC of FIG. 5, three optical fibers 12a to 12c are all branched into a single coupling ring 11 at different coupling points.

Each of the optical fibers 12a to 12c is branched at corresponding branching points 10a to 10c, and is connected such that the optical fiber 12a to 12c approach in an asymptotic pattern towards the lines La to Lc that radiate from the center of coupling ring 11. The lines La to Lc are preferably equally separated by an angle of 120 degrees. However, this angle may be modified to suit different purposes, e.g. for miniaturization of the wiring area.

As the light signal moves clockwise around the coupling ring 11, the directions of light signal in each of optical fibers 12a to 12c are established such that they correspond to the light travel direction in the coupling ring 11 at each of branching points 10a to 10c.

In the above embodiment, the linear displacement of the light signal is transformed into a generally circular movement by using a single coupling ring 11. As a result, the coupling members of the light input terminals 13a to 13c of optical fibers 12a to 12c are not concentrated in a same single area, and likewise for the coupling members of the light output terminals 14a to 14c of optical fibers 12a to 12d. Thus, the light input terminal 13a of the first optical fiber 12a and the light output terminal 14c of the third optical fiber 12c can be connected to a first optical communications apparatus. Likewise, the light input terminal 13b of the second optical fiber 12b and the light output terminal 14a of the first optical fiber 12a can be connected to a second optical communications apparatus, while the light input terminal 13c of the third optical fiber 12c and the light output terminal 14b of the second optical fiber 12b can be connected to a third optical communications apparatus. In this manner, the workload for connecting cables to optical communications apparatuses is greatly simplified.

The manufacture of the star-type optical coupler SC including triple branching only requires the use of three optical fibers 12a to 12c. It is thus possible to avoid forming an excessive number of optical fibers resulting from the use of $2^m$ units of optical fibers (e.g. 2, 4, 8, 16 fibers etc.) as in the case of the prior art star-type optical couplers having multiple-step branchings. For example, in the known star-type optical couplers including triple branching, four optical fibers are used (c.f. optical fibers 3a to 3d in FIG. 2). By contrast, only three optical fibers 12a to 12c are used in the above embodiment. The number of parts used is correspondingly reduced.

Light attenuation due to the structure of coupling ring 11 can be determined by experiments. When a reference light (0 dBm) enters the first optical fiber 12a, the light signal is outputted at the light output terminal 14a of the first optical fiber 12a, at the light output terminal 14b of the second optical fiber 12b and at the light output terminal 14c of the third optical fiber 12c at levels which are −3 dBm, −6 dBm and −9 dBm, respectively. Likewise, when a reference light (0 dBm) enters the second optical fiber 12b, the light signal is outputted at the light output terminal 14b of the second optical fiber 12b, at the light output terminal 14c of the third optical fiber 12c and at the light output terminal 14a of the first optical fiber 12a at levels which are −3 dBm, −6 dBm and −9 dBm, respectively. A reference light (0 dBm) entering the third optical fiber 12c proceeds the same way. Although the output levels at each light output terminal are different, these differences can easily be corrected in an optical communications apparatus prior to its reception.

FIG. 6 shows a star-type optical coupler SC including a quadruple branching, according to a third embodiment of the present invention. In FIG. 6, the same reference numerals as in FIGS. 4 and 5 are used for the same functional features.

As in the preceding embodiments, the star-type optical coupler of this embodiment includes a plurality of optical fibers 12a to 12d that are branched into a single coupling ring 11 at one branching point thereof. The only difference is the number of optical fibers used (four optical fibers 12a to 12d).

The optical fibers 12a to 12d are thus each coupled with the coupling ring 11 at branching points 10a to 10d. As shown in FIG. 6, the optical fibers 12a to 12d are wired such that they gradually close with the lines La to Ld that radiate from the center of the coupling ring 11.

The light signal travels clockwise around the coupling ring 11. The directions of light signals in the optical fibers 12a to 12d at the branching points 10a to 10d are established such that they correspond to that of the light signal in the coupling ring 11 at their branching points.

Light attenuation due to the structure of coupling ring 11 is summarized as follows: when a reference light (0 dBm) enters the light input terminal 13a of the first optical fiber 12a, the light output levels at the light output terminal 14a of the first optical fiber 12a, at the light output terminal 14b of the second optical fiber 12b, at the light output terminal 14c of the third optical fiber 12c and at the light output terminal 14d of the fourth optical fiber 12d are: −3 dBm, −6 dBm, −9 dBm and −12 dBm, respectively. A reference light (0 dBm) entering the second to fourth optical fibers 12b to 12d proceeds the same way. Although the output levels at each light output terminal are different, these differences can easily be corrected in an optical communications apparatus prior to its reception.

Figure 7:
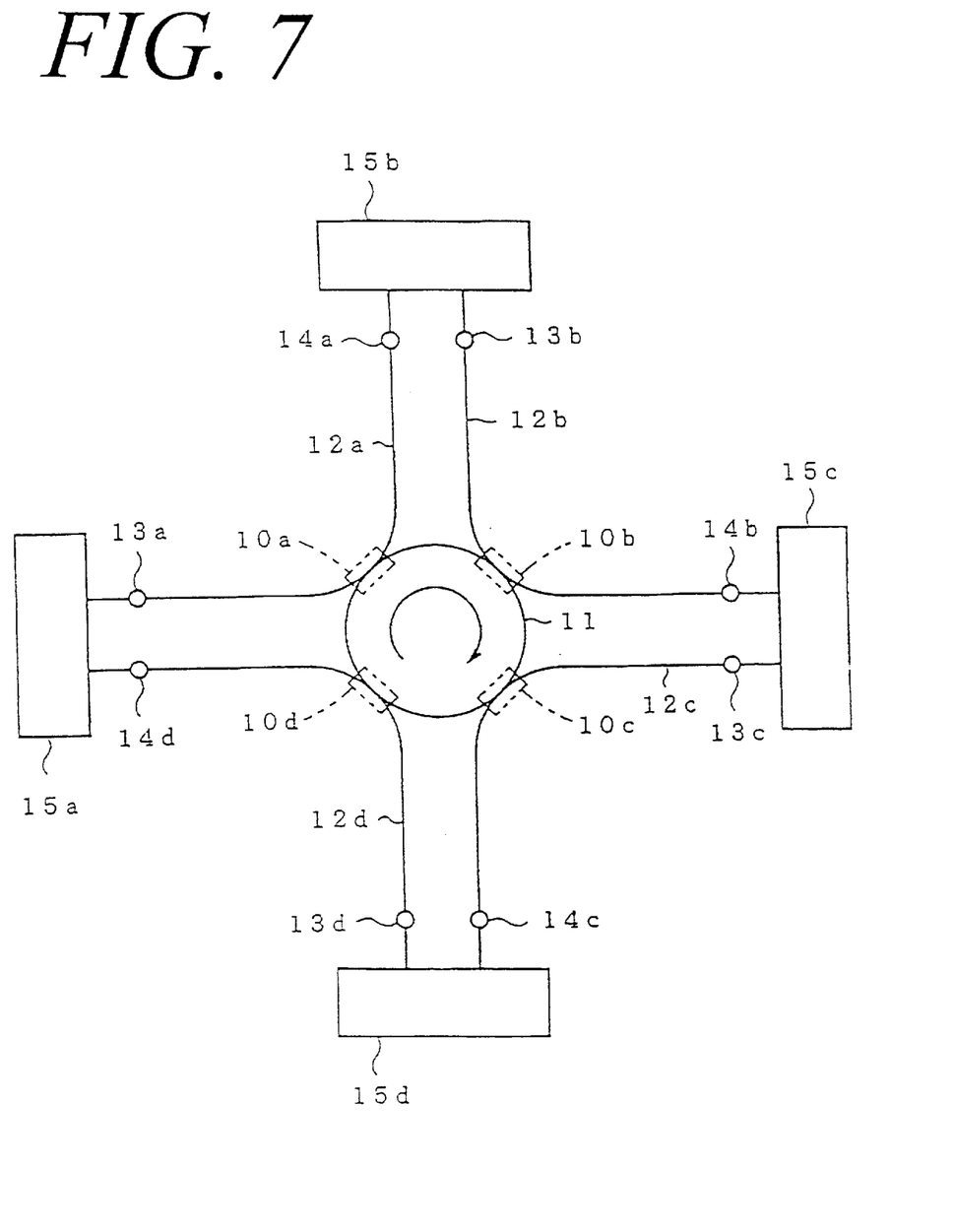
FIG. 7 shows the star-type optical coupler of FIG. 6 when connected to a plurality of optical communications apparatuses.

In FIG. 7, a star-type optical coupler SC according to the third embodiment is connected to four optical communications apparatuses 15a to 15d. The first optical communications apparatus 15a is placed near the light input terminal 13a of the first optical fiber 12a and the light output terminal 14d of the fourth optical fiber 12d, and connected thereto. Likewise, the second optical communications apparatus 15b is placed near the light input terminal 13b of the second optical fiber 12b and the light output terminal 14a of the first optical fiber 12a, and is connected thereto. The third optical communications apparatus 15c is placed near the light input terminal 13c of the third optical fiber 12c and the light output terminal 14b of the second optical fiber 12b, and is connected thereto. Further, the fourth optical communications apparatus 15d is placed near the light input terminal 13d of the fourth optical fiber 12d and the light output terminal 14c of the third optical fiber 12c, and is connected thereto. By virtue of this arrangement, the star-type optical coupler SC according to the present invention is more easily assembled with its peripheral apparatuses than in the case shown in FIG. 3. Consequently, the terminal zones of the star-type optical coupler SC can be easily contained in housings, and give a more tidy appearance.

Although star-type optical couplers having double, triple and quadruple branchings have been described above, the number of branchings can further be increased.

Figure 8:
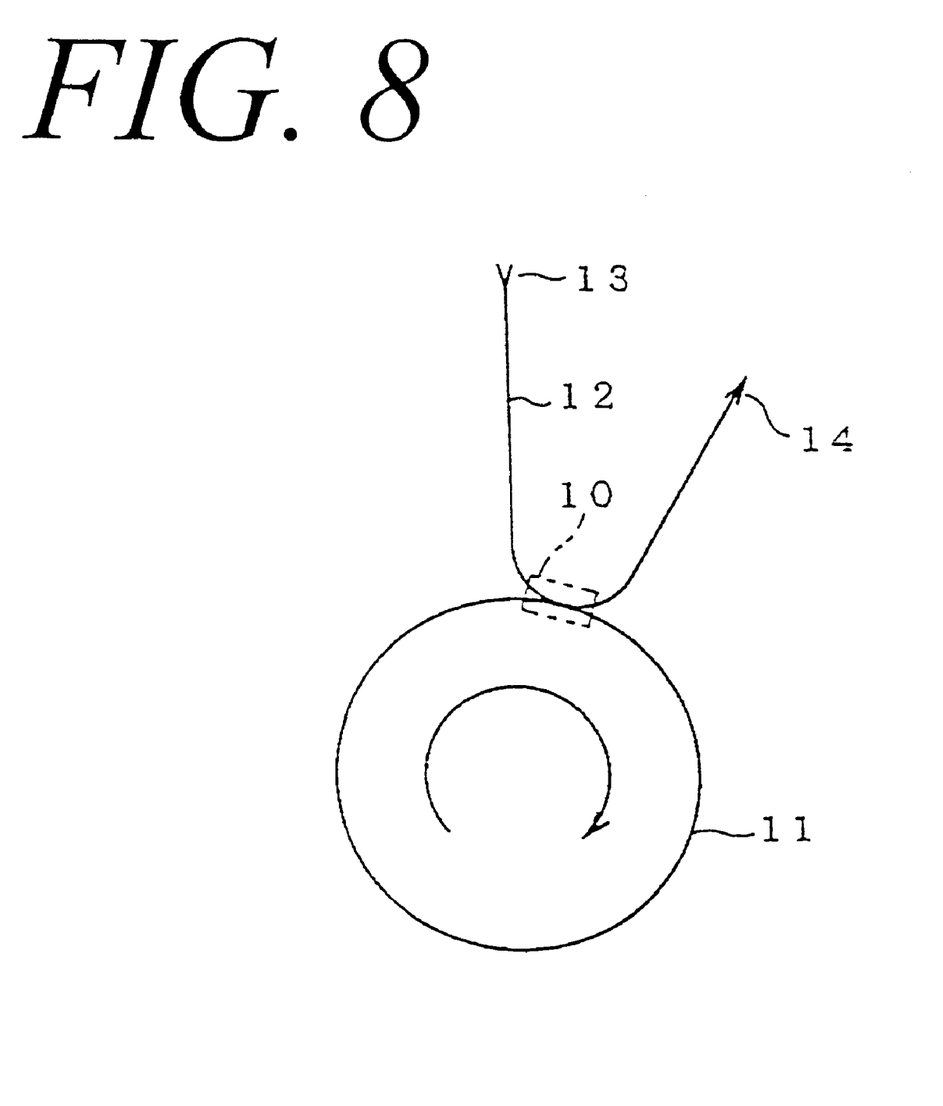
FIG. 8 is a schematic view of a branching point in a variant star-type optical coupler according to the invention.

FIG. 8 shows a branching point 10 between one of the optical fibers 12 and a coupling ring 11. As shown in this figure, the greater the number of branching becomes, the smaller becomes the radius of curvature of each of optical fibers 12. Therefore, the number of branchings can be increased all the while the radius of curvature is above the minimum flexing radius, i.e. about 5 to 10 mm.

By virtue of the coupling ring according to the invention, the light travel direction is transformed into a generally circular motion. As a result, a plurality of light input terminals of optical fiber are separately arranged, as are a plurality of light output terminals of optical fiber. Moreover, a first optical fiber includes a light signal input terminal located at an end portion thereof, while a second optical fiber is arranged adjacent to the first optical fiber along the generally circular direction of the coupling ring, such that the light output terminal of the second optical fiber is located near the same end portion the first optical fiber. As the light input terminal of the first optical fiber and the light output terminal of the second optical fiber can be disposed in the same vicinity, they can be connected together to an optical communications apparatus. By virtue of this configuration, wiring of cables for connecting to the optical apparatus can be simplified. Accordingly, housing of cables or other parts becomes easier, and the arrangement around the star-type optical coupler more tidy.

Each optical fiber is branched into the coupling ring through a single branching point, through which the optical fiber is connected to the other optical fibers. Further, the number of optical fibers to be installed in a star-type optical coupler can be limited to a number actually desirable for branching. Consequently, when an odd number of branchings, such as 3-, 5- or 7-fold branching is desired, the star-type optical coupler of the invention can avoid using unnecessary numbers of optical fibers. This is not the case with the known multi-step branching coupler that requires an even number of optical fibers. The number of optical fibers to be used inside the coupler can thus be reduced depending on the number to be used. The number of parts required can also be reduced accordingly.

According to another aspect of the invention, the coupling ring and the optical fibers have a radius of curvature which is set to be greater than the minimum flexing radius. As a result, optical loss is limited to a degree which is acceptable for practical use.

Although the invention has been described with reference to particular means, materials, and embodiments, it is to be understood that the invention is not limited to the particulars disclosed and extends to all equivalents within the scope of the claims.

The present disclosure relates to subject matter contained in priority Japanese Application No. HEI-10-91500, filed on Apr. 3, 1998, which is herein expressly incorporated by reference in its entirety.

What is claimed:

1. A star-type optical coupler comprising:
   a plurality of optical fibers adapted for passing a light signal having a substantially linear displacement, said optical fibers including at least a first optical fiber and a second optical fiber located adjacent thereto, and each optical fiber including a light signal input terminal, a light signal output terminal and an intermediate portion, said intermediate portion including a branching point;
   a coupling ring having a substantially circular configuration and including a corresponding number of branching points, said coupling ring being adapted for transforming said substantially linear displacement of said light signal into a generally circular movement;
   wherein said plurality of optical fibers are branched into said coupling ring through said branching points, whereby said coupling ring transforms said substantially linear displacement of said light signal into said generally circular movement, such that said light input terminals can be disposed separately from one another and said light output terminals can also be disposed separately from one another, and such that said light input terminal of said first optical fiber and said light output terminal of said second optical fiber are arranged adjacent to each other.

2. The star-type optical coupler according to claim 1, wherein said coupling ring has a minimum flexing radius defined so as not to cause an increase of optical loss, and said coupling ring is configured to have a radius of curvature greater than said minimum flexing radius.

3. The star-type optical coupler according to claim 1, wherein said plurality of optical fibers have a minimum flexing radius defined so as not to cause an increase of optical loss, and said plurality of optical fibers are bent at said branching points with a radius of curvature greater than said minimum flexing radius.

4. The star-type optical coupler according to claim 2, wherein said plurality of optical fibers have a minimum flexing radius defined so as not to cause an increase of optical loss, and said plurality of optical fibers are bent at said branching points with a radius of curvature greater than said minimum flexing radius.

* * * * *